(12) United States Patent
Ota et al.

(10) Patent No.: US 9,067,285 B2
(45) Date of Patent: Jun. 30, 2015

(54) AUTOMATIC SCREW TIGHTENING APPARATUS

(75) Inventors: Yoshitake Ota, Iwate (JP); Hiroshi Takahashi, Iwate (JP)

(73) Assignee: OHTAKE ROOT KOGYO CO., LTD., Iwate (JP)

( * ) Notice: Subject to any disclaimer, the term of this patent is extended or adjusted under 35 U.S.C. 154(b) by 567 days.

(21) Appl. No.: 13/228,571

(22) Filed: Sep. 9, 2011

(65) Prior Publication Data
US 2012/0067176 A1 Mar. 22, 2012

(30) Foreign Application Priority Data
Sep. 13, 2010 (JP) ................................. 2010-204423

(51) Int. Cl.
| | |
|---|---|
| B25B 23/04 | (2006.01) |
| B25B 23/06 | (2006.01) |
| B23P 19/06 | (2006.01) |
| B25B 23/08 | (2006.01) |
| B23P 19/00 | (2006.01) |

(52) U.S. Cl.
CPC ................. *B23P 19/06* (2013.01); *B25B 23/08* (2013.01); *B25B 23/04* (2013.01); *B23P 19/006* (2013.01)

(58) Field of Classification Search
CPC ...... B23P 19/006; B23P 19/06; B23P 19/004; B23P 19/007; B25B 23/04; B25B 23/08; B25B 23/10
USPC ...................................................... 81/430–435
See application file for complete search history.

(56) References Cited

U.S. PATENT DOCUMENTS

| | | | | |
|---|---|---|---|---|
| 2,843,166 | A | * 7/1958 | Van Alstyne | 81/435 |
| 5,015,127 | A | * 5/1991 | Hockman | 406/192 |
| 2011/0209589 | A1 | 9/2011 | Ota et al. | |

FOREIGN PATENT DOCUMENTS

JP 08-229752 9/1996

* cited by examiner

*Primary Examiner* — Bryan R Muller
(74) *Attorney, Agent, or Firm* — Dilworth & Barrese, LLP.

(57) ABSTRACT

In an automatic screw tightening apparatus, a feed head unit is movable to and from close contact with a driver bit portion. The driver bit portion contacts the screw and sucks the head portion of the screw in close contact. The feed head unit includes a longitudinal groove opened to the outside and connected to a vertically extending screw feed hole. Only a thread portion of the screw is capable of horizontally advancing and retreating in the longitudinal groove.

10 Claims, 17 Drawing Sheets

AUTOMATIC SCREW TIGHTENING APPARATUS

BACKGROUND OF THE INVENTION

1. Technical Field

The present invention relates to an automatic screw tightening apparatus which automatically tightens a screw against a predetermined screwed portion of a subject by a screw tightening mechanism.

2. Related Art

In an automatic screw tightening apparatus according to the related art for automatically tightening a screw against a predetermined screwed portion of a subject by a screw tightening mechanism as disclosed in Japanese Patent Application Laid-Open No. Hei8-229752, predetermined screws are automatically fed from a screw feeding mechanism to a screw tightening head of a fore end of the screw tightening mechanism one by one. Then, the subject is fixed to a movable table and the screwed position of the subject moves to a predetermined position while the screw tightening head of the screw tightening mechanism moves. Next, a screw is tightened to assemble the subject.

In this case, screws are fed to the screw tightening mechanism through a feeder hose. However, there are disadvantages as follows. For example, tips of screws often get stuck in the hose. Further, since the screw feeding mechanism should move with the feeder hose attached to the screw tightening head, the screw feeding mechanism is large. Furthermore, since the movement range of the screw tightening mechanism should be wide, the screw tightening apparatus is disadvantageous in space. Moreover, unexpected accidents may happen due to contact of workers or subjects with the hose or others.

Meanwhile, screw tightening mechanisms in which a driver bit unit sucks air from a gap between a driver bit (BIT) and a screw holder so as to engage a screw with the driver bit and hold the screw are disclosed in Japanese Patent Application Laid-Open No. Hei8-229752, Japanese Patent Application No. 2010-29559 filed previously by the applicant of the present application, and so on.

SUMMARY OF THE INVENTION

The present invention has been made considering the above-mentioned problems and is to provide an automatic screw tightening apparatus for automatically tightening a screw against a predetermined screwed portion of a subject by a screw tightening mechanism in which smooth and automatic assembling is possible, a fore end portion of the screw tightening mechanism smoothly moves up and down without being connected to a hose or others, the screw tightening mechanism is small-sized and compact, and the movement range of the screw tightening mechanism is reduced.

In order to achieve the above-mentioned object, according to an embodiment of the invention, there is provided an automatic screw tightening apparatus that transfers a screw from a screw feeding mechanism to a screw tightening mechanism by a screw transferring mechanism using compressed air from the screw feeding mechanism, engages the screw with a driver bit portion of a fore end of the screw tightening mechanism, and tightens the screw against a predetermined screwed portion. In the automatic screw tightening apparatus, a discharging unit that transfers the screw in a transfer tube of the screw feeding mechanism with a head portion being in the lead is provided in the screw feeding mechanism. A feed head unit is provided at a fore end of the discharging unit and has a screw feed hole having a diameter slightly larger than the head portion of the screw, and a movable arm is provided to the feed head unit to be horizontally movable. The feed head unit is provided to be movable between a close-contact position where the feed head unit is in close contact with the driver bit portion of the fore end of the screw tightening mechanism and an evacuation position where the feed head unit is spaced apart from the driver bit unit. At the close contact position, the driver bit portion of the fore end of the screw tightening mechanism is brought into contact with the screw and sucks the head portion of the screw so as to be engaged with the screw. The feed head unit includes a longitudinal groove provided at an appropriate position and opened to the outside, such that the screw engaged with the driver bit portion can horizontally moves to the outside. The longitudinal groove is connected to the screw feed hole vertically extending, and only a thread portion of the screw is capable of advancing and retreating in the longitudinal groove.

In the automatic screw tightening apparatus, curved passage of the feed head unit may be formed by forming curved guide grooves for guiding the screw in matching surfaces of splittable guide block components.

According to the automatic screw tightening apparatus of the embodiment of the present invention, since screws are transferred with the head portions S1 of the screws being in the lead by the screw transferring mechanism using compressed air from the screw feeding mechanism, the inner wall of the transfer tube is less damaged, the screws do not get stuck in the transfer tube, and it is possible to stabilize the posture of the screws so as to firmly engage the screws with the driver bit such that it is possible to stably feed the screws and improve reliability.

Further, it is possible to automatically and quickly tighten the screw engaged with the driver bit against the screwed portion of the subject. Furthermore, a configuration for engagement of the screw with the driver bit is simple, maintenance is easy, and the fabrication cost is low.

According to the automatic screw tightening apparatus of the embodiment of the present invention, since curved guide grooves for guiding the screws are formed in the matching surfaces of splittable guide block components, a curved portion of a screw guide passage formed by the guide grooves is not flattened, unlike the related art. Further, a design can be freely made such that the cross-section of the screw guide passage has a uniform true circle shape over the screw guide passage or has a slightly larger true circle shape only in the curved portion if necessary.

Figure 5:
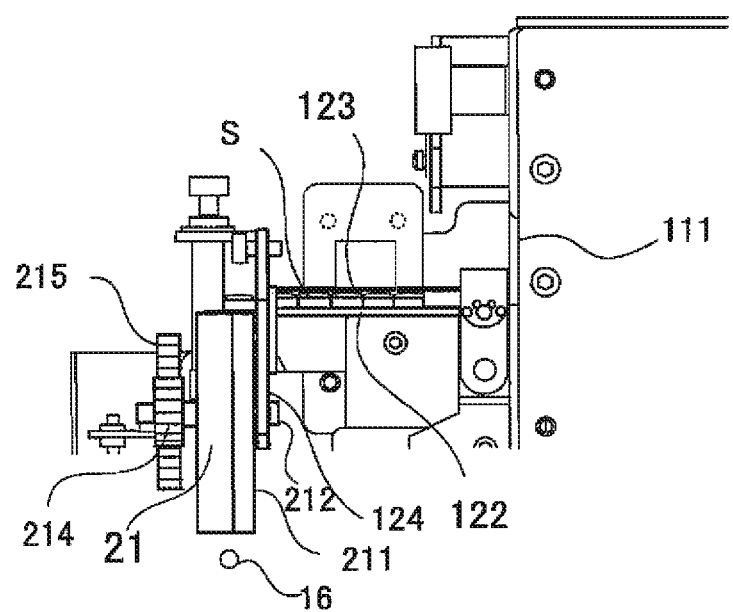
FIG. 5 is a partial right-side view illustrating the screw discharging unit of FIG. 4.
Figure 6:
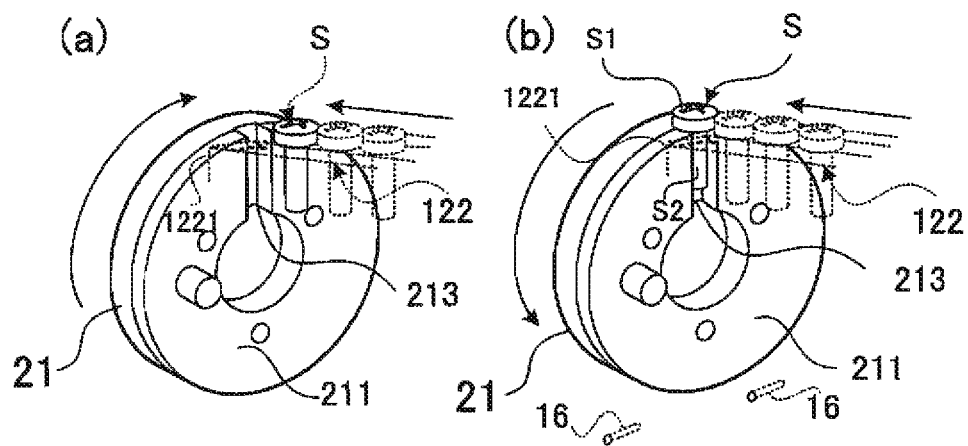

(a) and (b) of FIG. 6 are enlarged perspective views explaining an operation of a screw bringing disk of FIG. 5.

Figure 7:
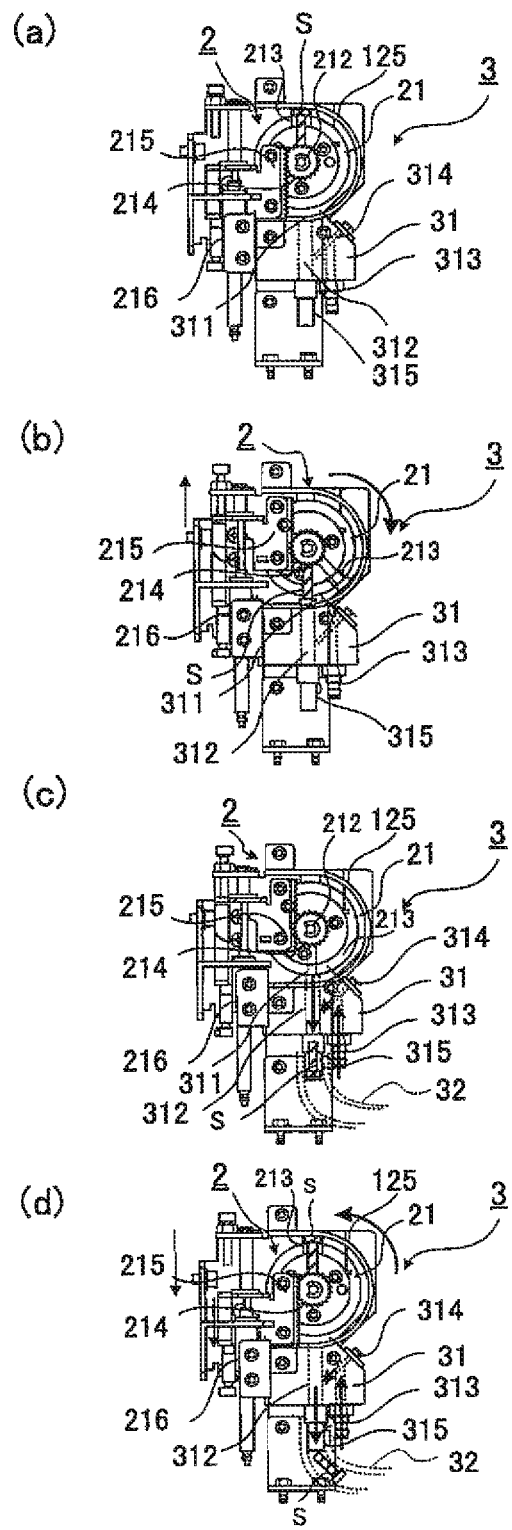

(a) to (d) of FIG. 7 are enlarged perspective views explaining operations of the screw discharging unit and the screw transferring mechanism.

Figure 8:
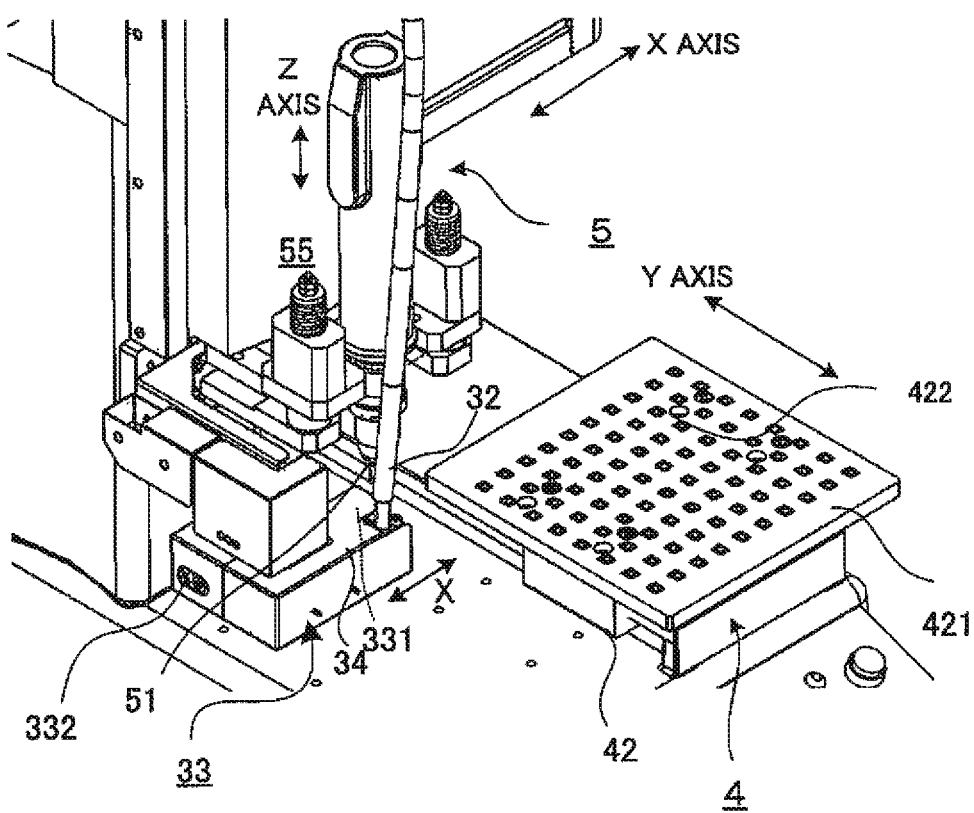

FIG. 8 is a plan view illustrating all of a discharging unit, a screw-tightening-mechanism moving unit, and a subject moving unit of the embodiment of the present invention as seen from above.

Figure 9:
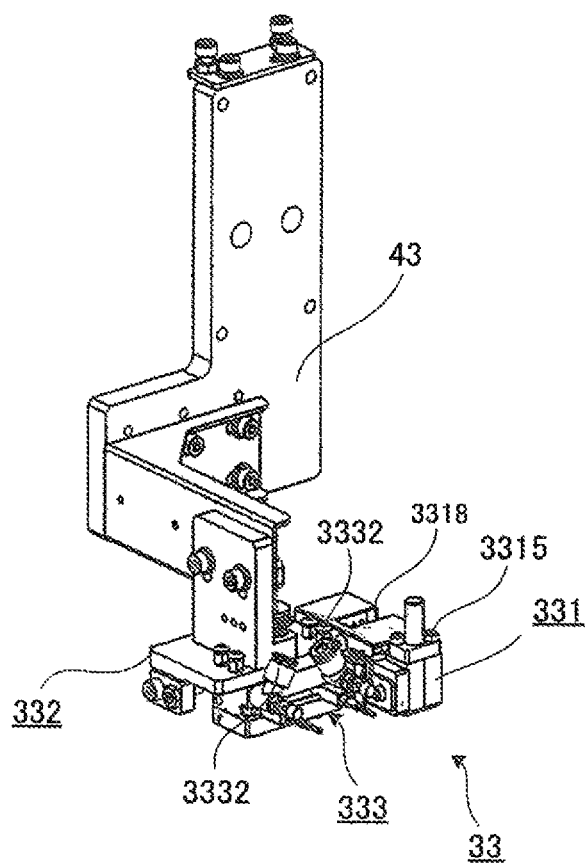

FIG. 9 is a partial perspective view illustrating the discharging unit of FIG. 8.

Figure 10:
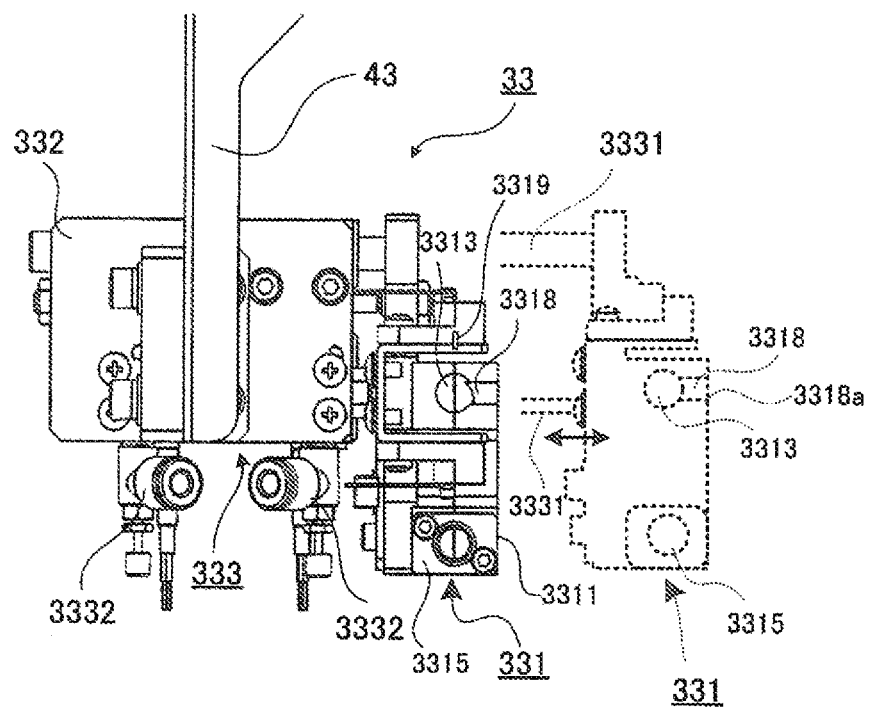

FIG. 10 is a top view illustrating the discharging unit.

Figure 11:
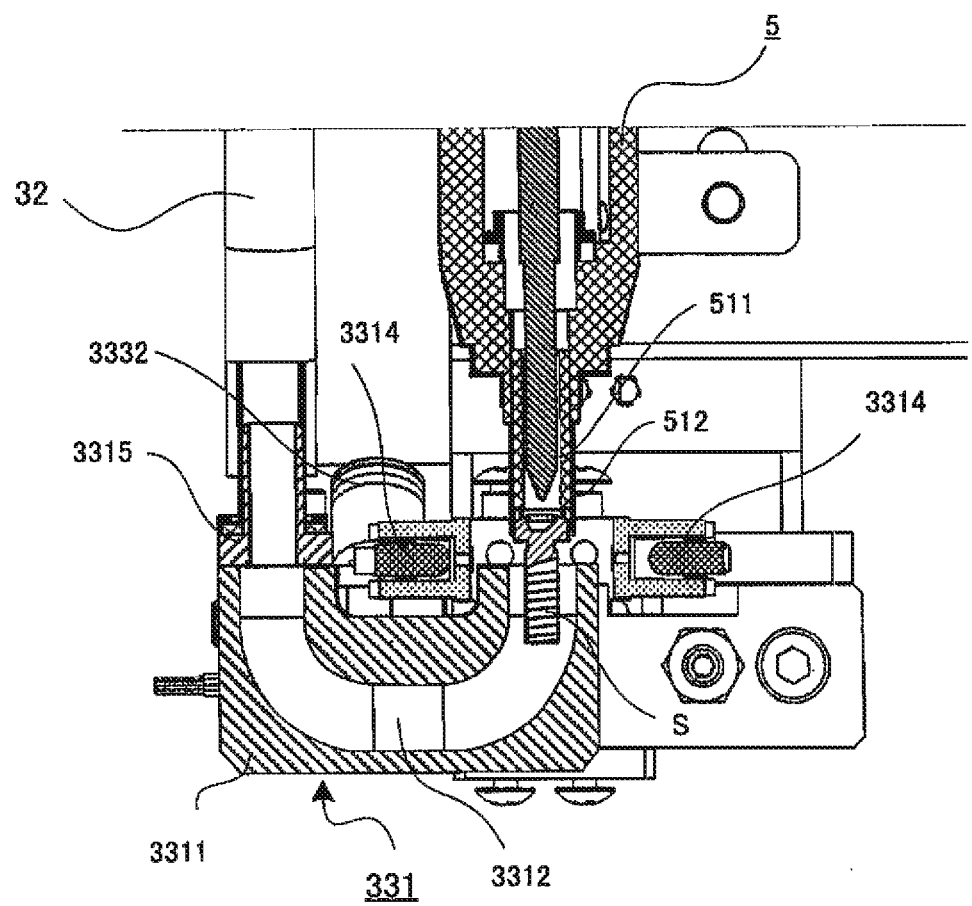

FIG. 11 is a cross-sectional view of a feed head unit.

Figure 12:
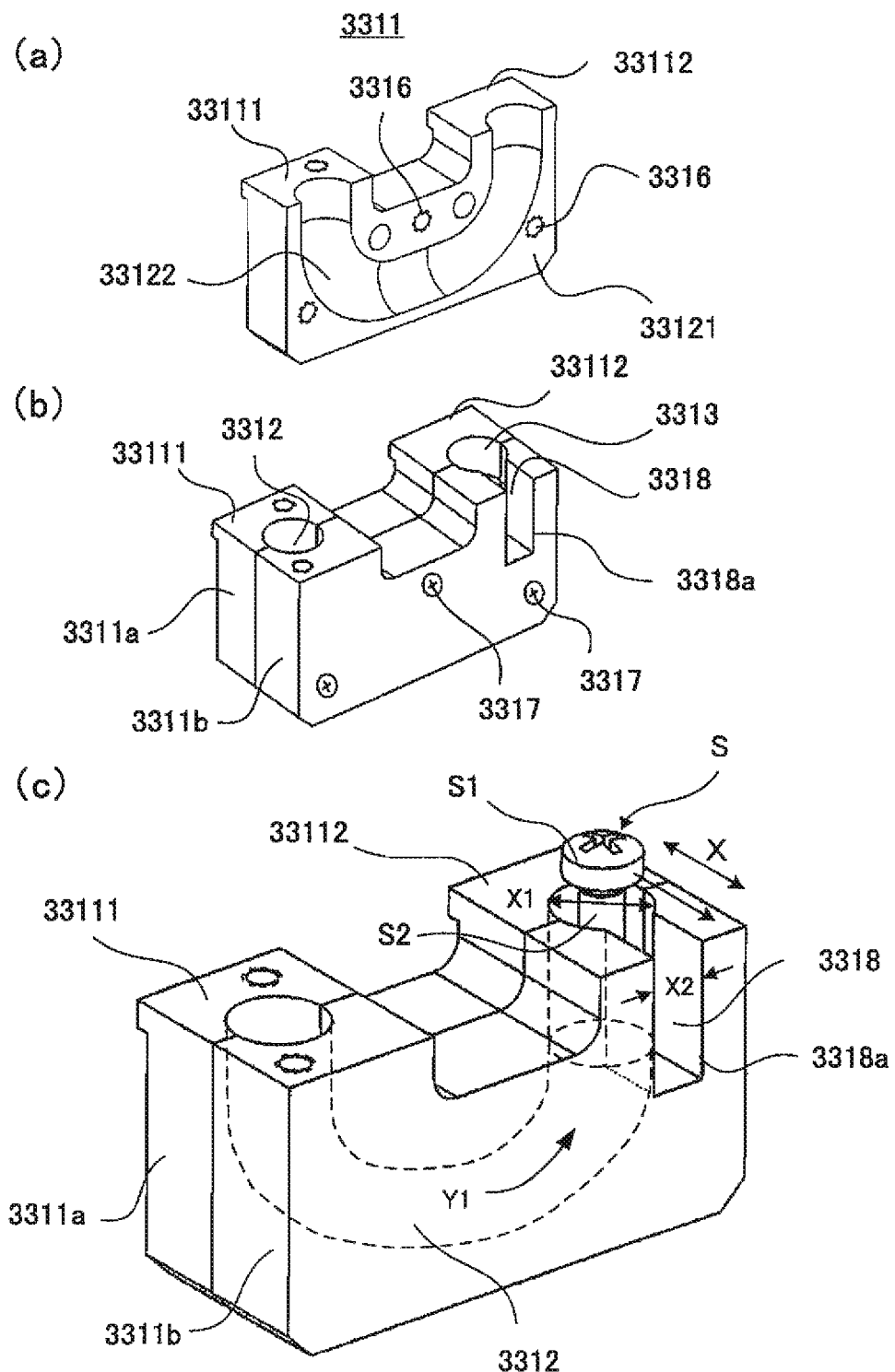

FIG. 12 is a perspective view illustrating guide block components of the feed head unit of the embodiment of the present invention.

Figure 13:
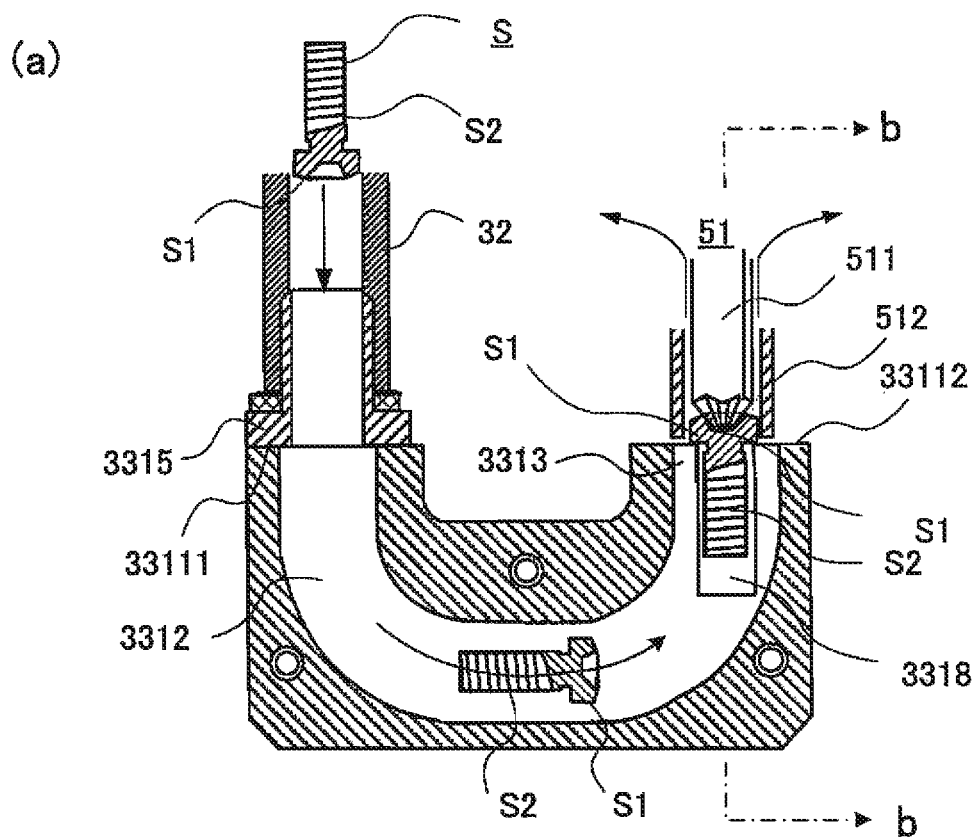
Figure 13:
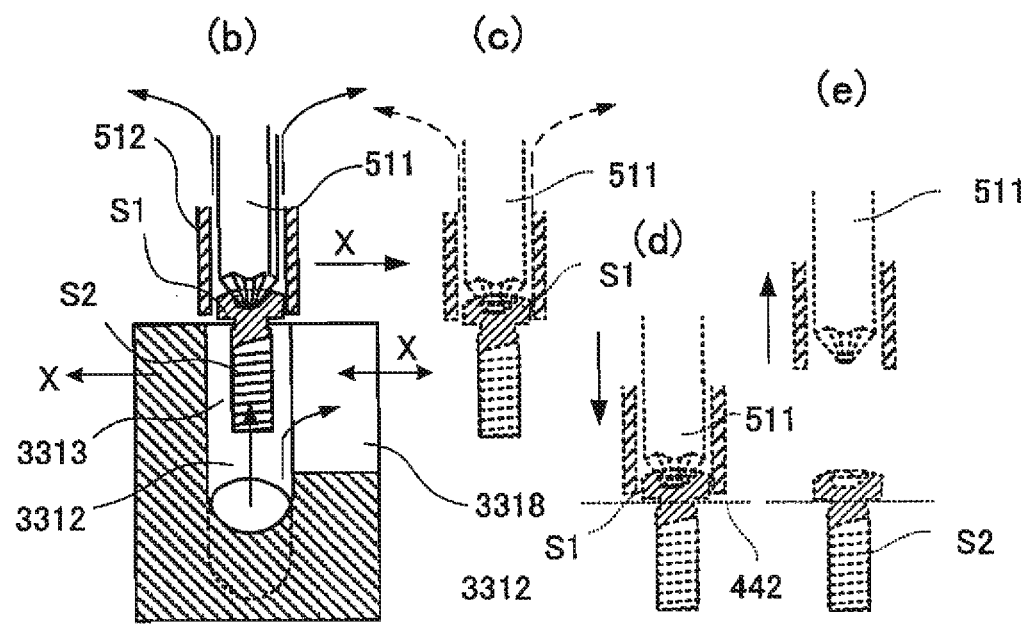

FIG. 13 is an explanatory view explaining an operation of engaging a screw with a driver bit (BIT) at the feed head unit according to the embodiment of the present invention.

Figure 14:
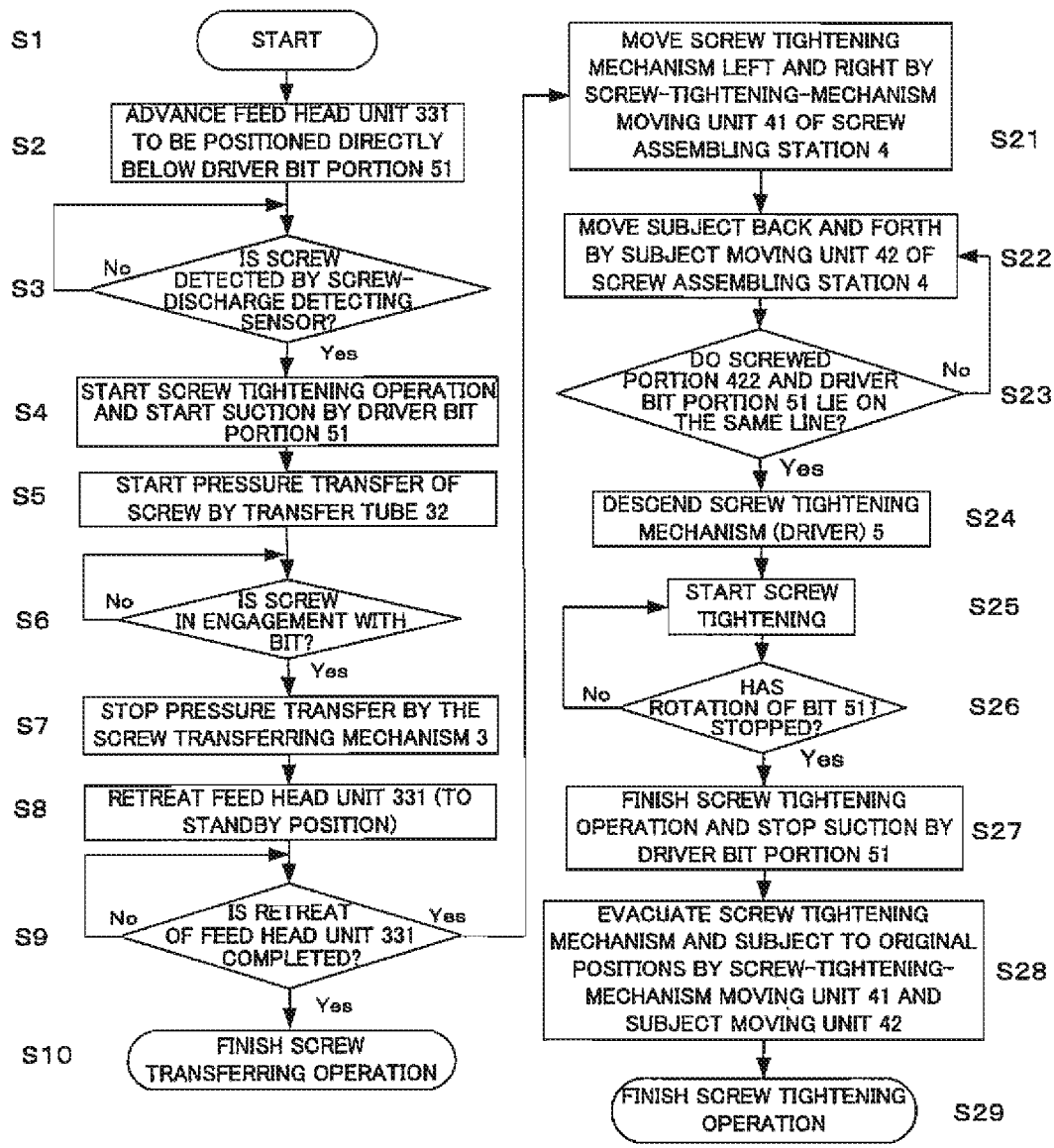

FIG. 14 is a flow chart illustrating the embodiment.

Figure 15:
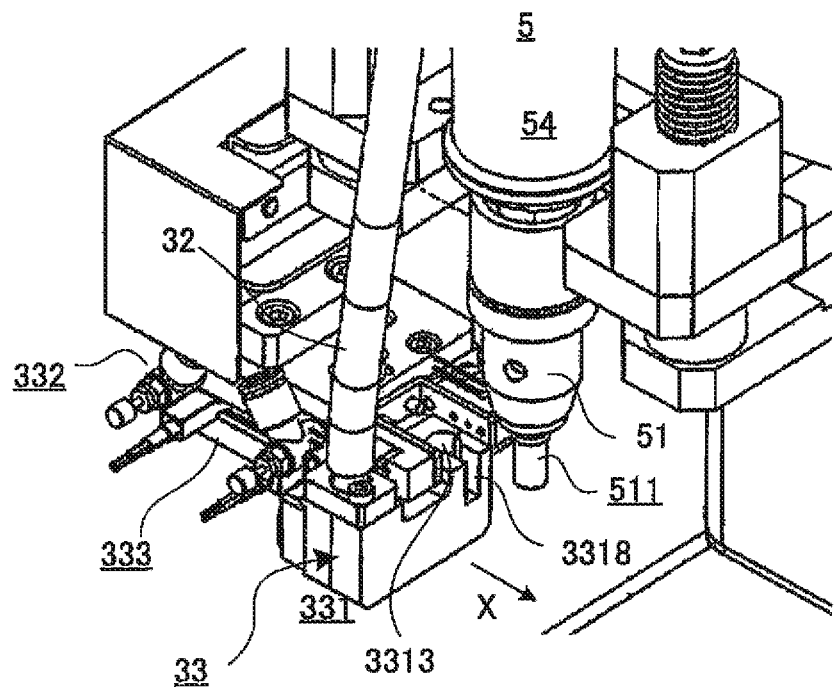

FIG. 15 is a perspective view illustrating a start state of automatic screw feeding manipulation in the embodiment.

Figure 16:
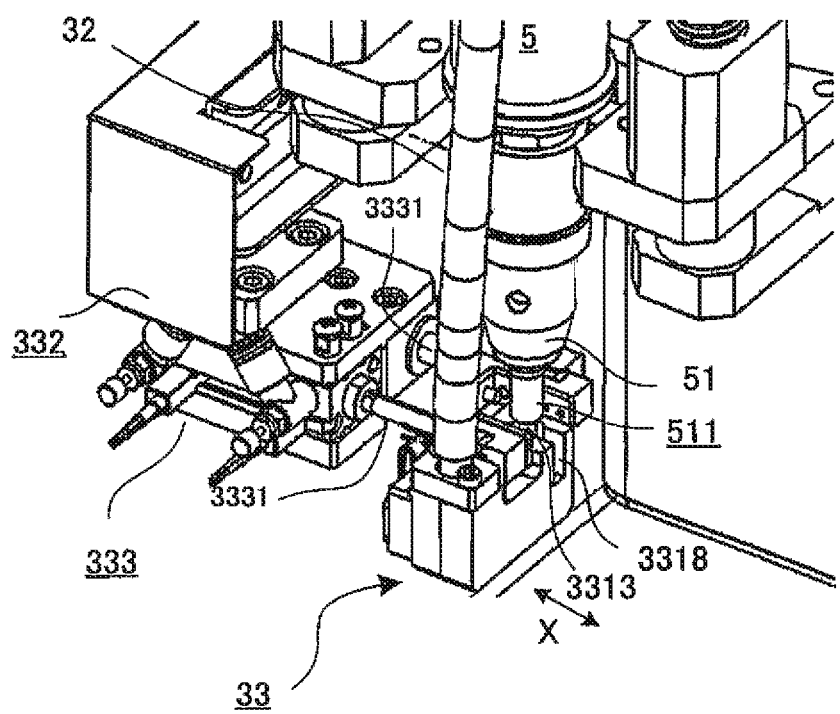

FIG. 16 is a perspective view illustrating a state in which the feed head unit 331 for feeding a screw is positioned right below a driver bit portion 51.

Figure 17:
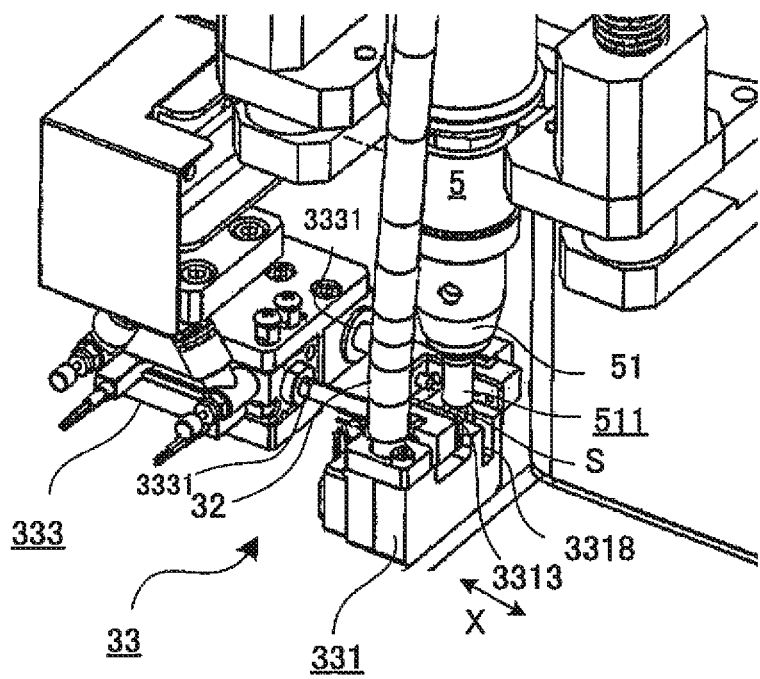

FIG. 17 is a perspective view illustrating a state in which the screw is engaged with the driver bit 511.

Figure 18:
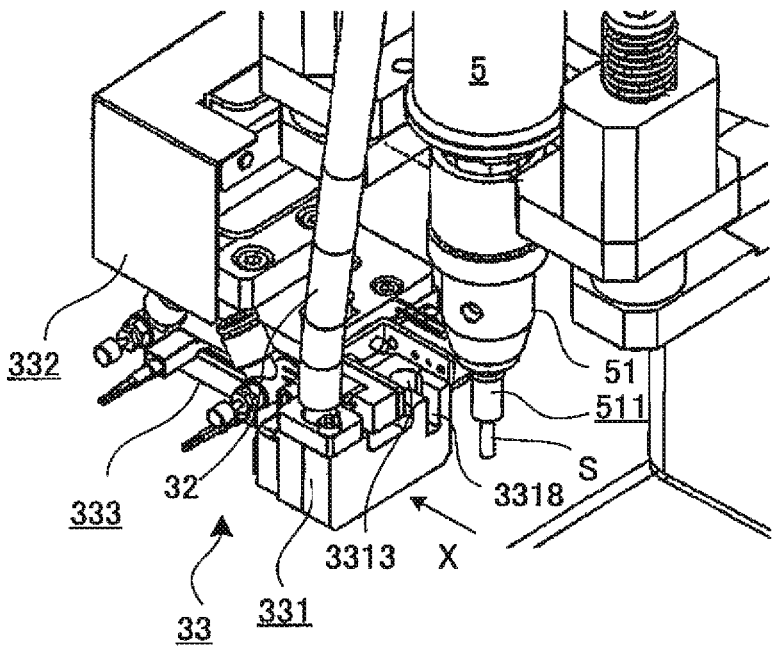

FIG. 18 is a perspective view illustrating a state in which the driver bit 511 is spaced apart from the feed head unit 331 with being engaged with the screw.

Figure 19:
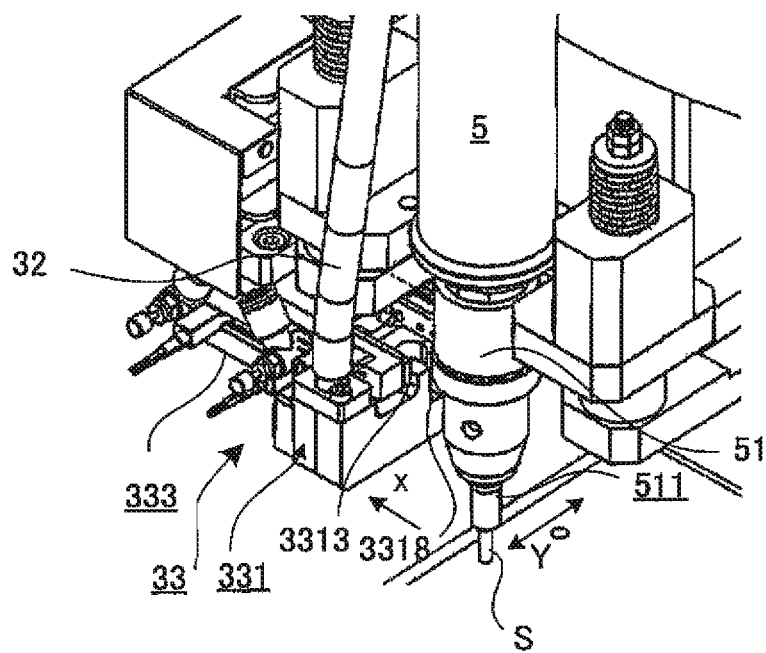

FIG. 19 is a perspective view illustrating an operation state in which the driver bit 511 descends and starts a screw tightening operation.

Figure 20:
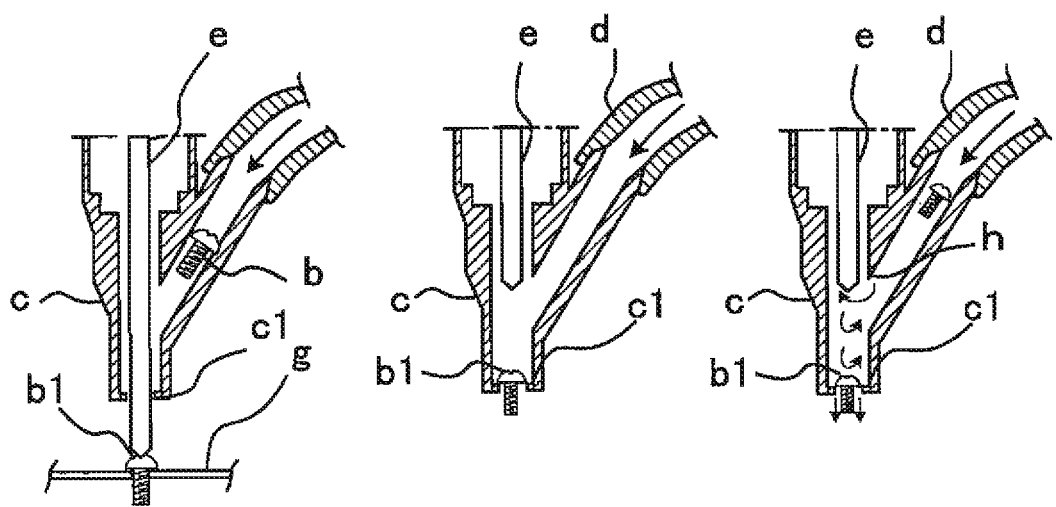

FIG. 20 is a cross-sectional view of an automatic screw tightening apparatus according to the related art.

Figure 21:
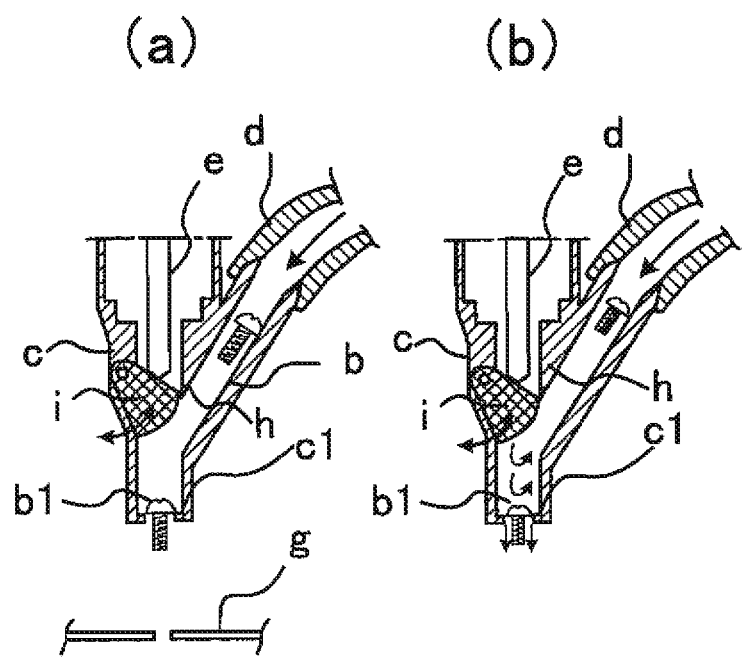

FIG. 21 is a cross-sectional view of another automatic screw tightening apparatus according to the related art.

DESCRIPTION OF EXEMPLARY EMBODIMENT

An embodiment of the present invention transfers screws one by one from a screw feeding mechanism to a screw tightening mechanism (driver) through a transfer tube such as a vinyl tube or hose with the head portions of the screws being in the lead in the transfer tube, and engages the head portion of each of the transferred screws with a fore end of a driver bit portion of the screw tightening mechanism by air suction of the screw tightening mechanism, thereby automatically and consecutively tightening the screws against desired screwed portions.

Hereinafter, an automatic screw tightening apparatus according to an embodiment of the present invention will be described in detail with reference to the accompanying drawings.

Whole Configuration

Figure 1:
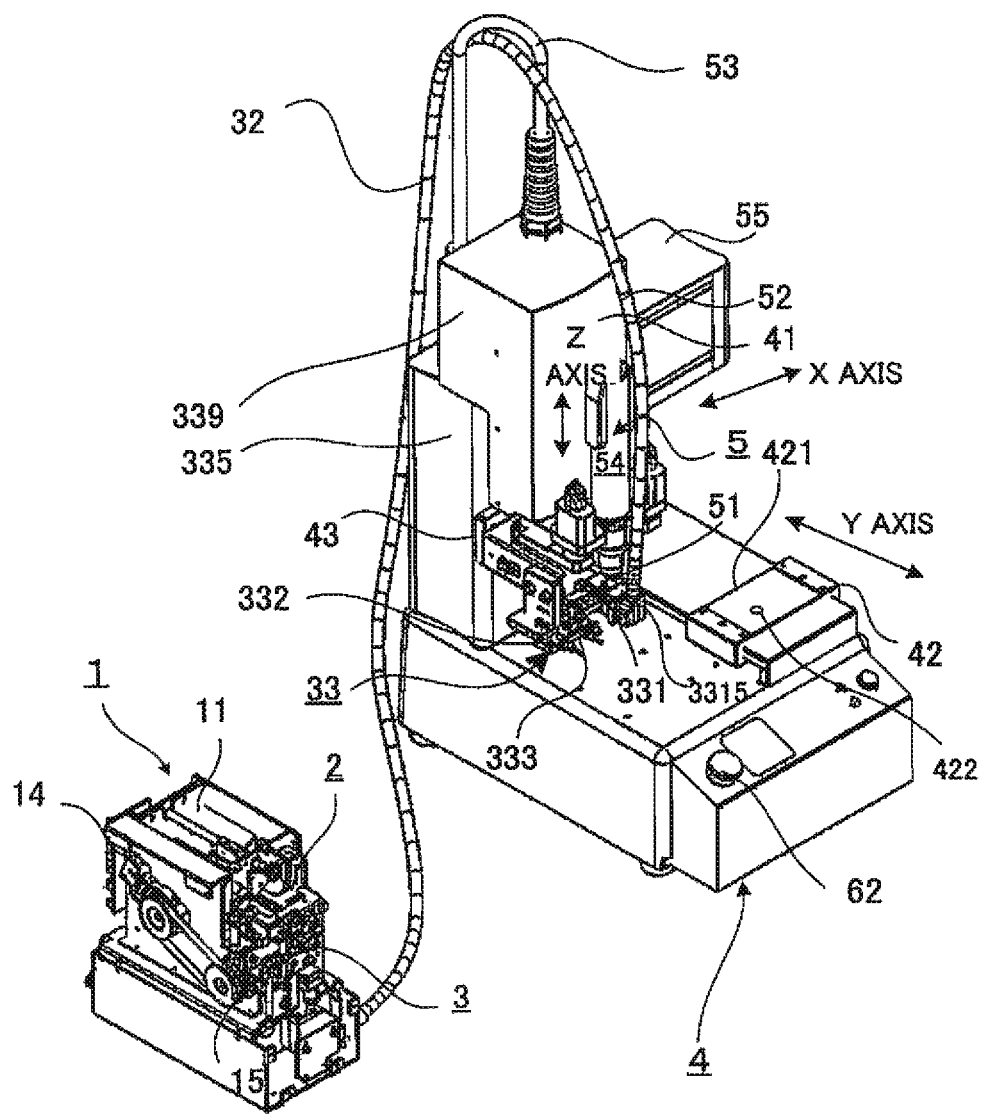
FIG. 1 is a perspective view illustrating an appearance of an automatic screw tightening apparatus according to an embodiment of the present invention.

An automatic screw tightening apparatus with a screw feeding mechanism according to an embodiment of the present invention will be wholly and schematically described with reference to FIG. 1. FIG. 1 is a perspective view illustrating a screw feeding mechanism 1, a screw transferring mechanism 3, and a feed head unit 331 with covers removed.

This embodiment is a kind of automatic screw tightening robot. According to this embodiment, the screw feeding mechanism 1 is disposed in the vicinity of a screw assembling station 4 or is disposed integrally with the screw assembling station 4. The screw feeding mechanism 1 transfers screws to a horizontally and linearly movable feed head unit 331 of a screw assembling station 4 through transfer tubes 32 of a screw transferring mechanism 3. Then, the feed head unit 331 and a driverbit (BIT) portion 51 of a fore end of a vertically movable screw tightening mechanism 5 installed at the screw assembling station 4 are aligned to lie on the same line. In this state, the driver bit portion 51 of the screw tightening mechanism 5 descends and sucks a head portion of a screw to be engaged with the head portion. Thereafter, while the screw tightening mechanism 5 moves left and right (in an X direction) by the screw-tightening-mechanism moving unit 41 of the screw assembling station 4, a subject 421 such as a camera or a portable phone moves forward or backward (in a Y direction) by the subject moving unit 42, such that a predetermined screwed portion 422 of the subject 421 and the driver bit portion 51 lie on the same line. Next, the screw is tightened.

Screw Feeding Mechanism 1

Here, first, the screw feeding mechanism 1 will be described with reference to FIGS. 2 to 6.

Figure 2:
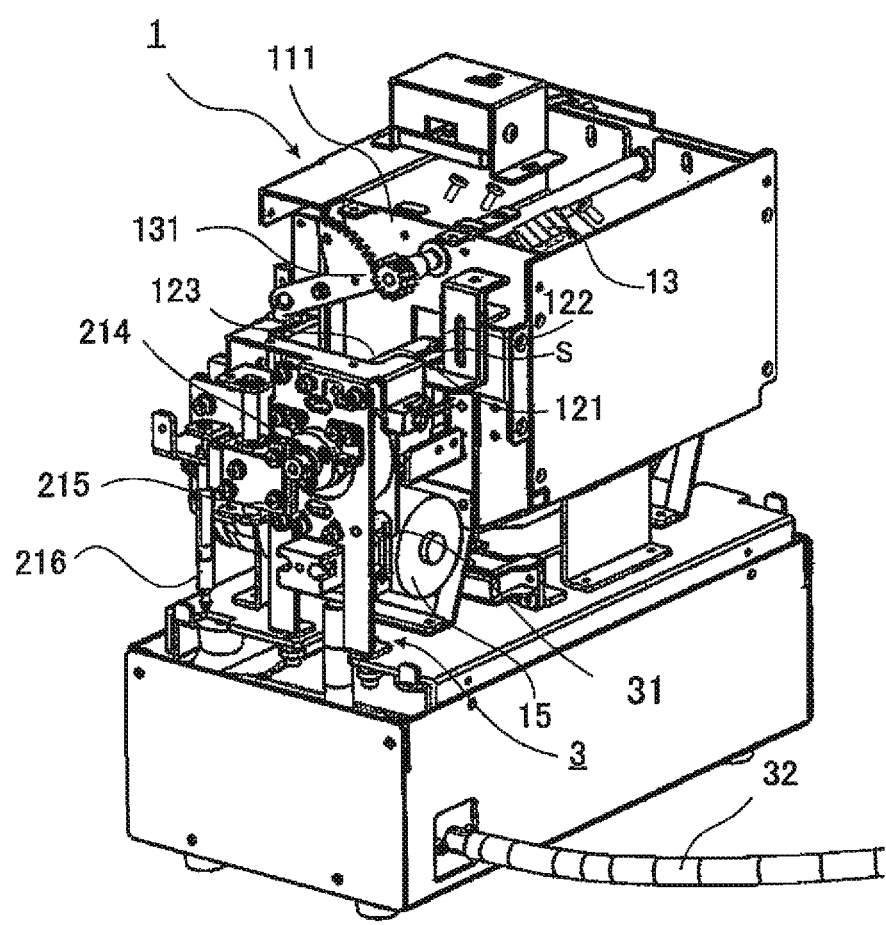
FIG. 2 is a perspective view illustrating an appearance of a screw feeding mechanism 1 of FIG. 1.
Figure 3:
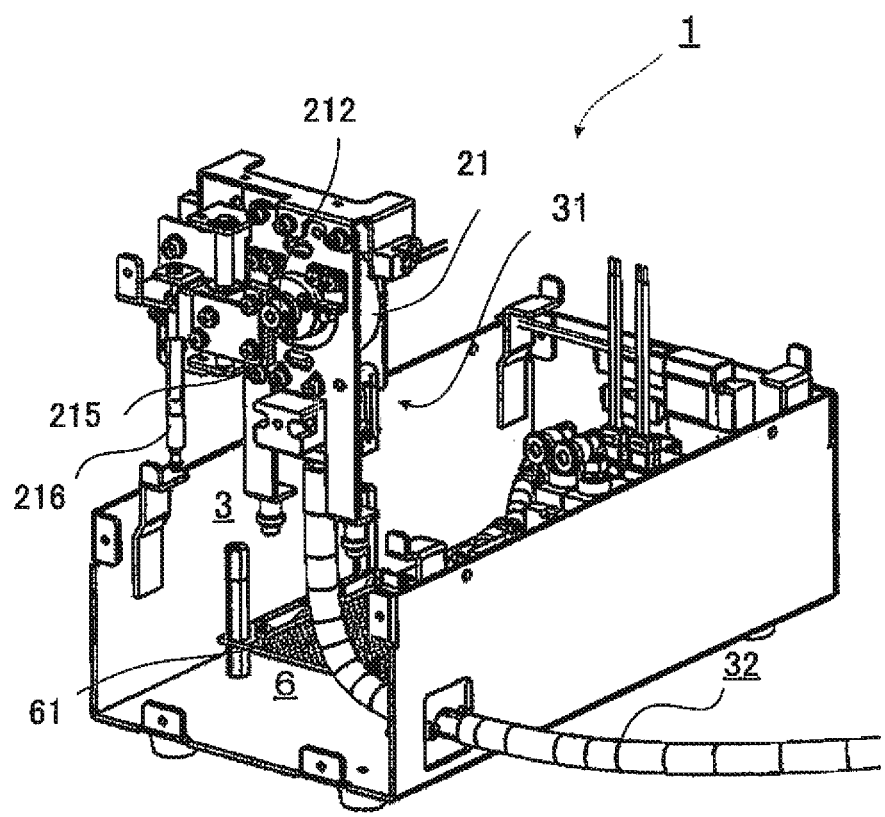
FIG. 3 is an exploded perspective view illustrating the screw feeding mechanism of FIG. 2.

FIG. 2 is a perspective view of the screw feeding mechanism 1 without an outer frame, and FIG. 3 is an exploded perspective view of the screw feeding mechanism 1 except for a screw storing unit 11. As shown in FIG. 2, screws S are stored in the screw storing unit 11 of the screw feeding mechanism 1, and the stored screws S are aligned and sequentially move to a front surface by a guide rail 12 protruding from a front casing board 111 of the screw storing unit 11 and an aligned-screw guide 122 installed at a fore-end portion 121 of the guide rail 12.

A mechanism to the screw aligning mechanism may be a well-known mechanism. In this embodiment, the guide rail 12 is vibrated such that the screws S in the screw storing unit 11 advance, spare screws S on the guide rail 12 are dropped by an oscillation brush 13, and the dropped screws S are re-induced to the guide rail 12 by a screw scooping unit 14 such as a turning magnetic positioned on a side surface. A brush turning mechanism 131 turns the oscillation brush 13 left and right, The brush turning mechanism 131 and the screw scooping unit 14 are driven by a transmission mechanism of a drive motor 15 or a pulley or a ring disposed on the front surface of the screw storing unit 11.

Screw Discharging Unit 2

Figure 4:
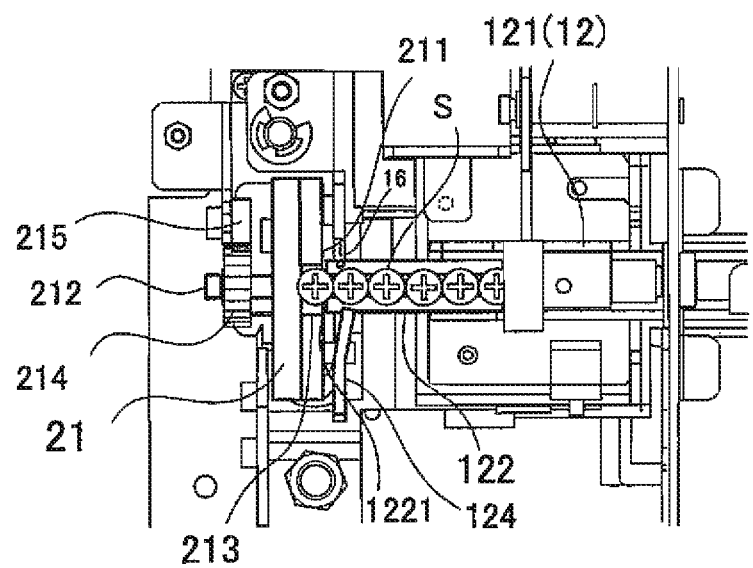
FIG. 4 is a plan view illustrating a screw discharging unit of FIG. 2 as seen from above a screw transferring unit.

Further, as shown in FIGS. 4 and 5, a screw aligning cover 123 is provided on the aligned-screw guide 122, and a screw discharging unit 2 is disposed to induce the screws S such that, in the next process, the head portions S1 of the screws S are located in the lead in the movement direction of the screws S in the transfer tube 32 of the screw transferring mechanism 3. The screw discharging unit 2 is disposed to be in contact with a guide fore-end surface 1221 of the aligned-screw guide 122 as shown in a top view of FIG. 4 and a left side view of FIG. 5.

The screw discharging unit 2 performs a preparation process for the screw transferring mechanism 3 to be described below and may be configured as a part of the screw transferring mechanism 3. A main component of the screw discharging unit 2 is a screw bringing disk 21 (see FIG. 6) which takes out the screws S on the aligned-screw guide 122 one by one by turning clockwise and counterclockwise. The screw bringing disk 21 turns clockwise and counterclockwise around a rotation shaft 212. A rotation surface 211 of the screw bringing disk 21 is provided at a right angle to the screw movement direction on the aligned-screw guide 122 of the screw feeding mechanism 1, and a screw receiving groove 213 is provided in the rotation surface 211 of the screw bringing disk 21. The screw receiving groove 213 is a groove which corresponds to the posture of the screws S fed from the aligned-screw guide 122 and has a width slightly greater than the diameter of the thread portions S2 of the screws S.

Further, on the opposite side of the screw bringing disk 21 to the side where the aligned-screw guide 122 is disposed, a drive gear 214 is fixed. The gear 214 is engaged with a rack 215 moving up and down. The vertical movement of the rack 215 is hydraulically controlled by a drive cylinder 216 according to a control command device (not shown), thereby turning the screw bringing disk 21 clockwise and counter-clockwise.

Screw Transferring Mechanism 3

Next, the operation of the screw transferring mechanism 3 will be described together with the configuration of the screw bringing disk 21 constituting part of the screw transferring mechanism 3 with reference to (a) to (d) of FIG. 7.

As shown in (a) of FIG. 7, in order to prevent a screw from dropping when the screw is fitted into the screw receiving groove 213 of the screw bringing disk 21 and the screw bringing disk 21 turns clockwise in the drawing, a side screw guide 124 (see FIG. 4) is provided on the screw feeding mechanism 1 side and a screw top guide 125 is provided along the outer circumference of the screw bringing disk 21 on the screw head portion side. In (a) of FIG. 7, the screw bringing disk 21 stands still in a state in which a screw is fitted into the screw bringing disk 21.

Next, as shown in (b) of FIG. 7, according to a turn command of the control command device not shown), the drive cylinder 216 is extended, the rack 215 moves upward, and the gear 214 and the screw bringing disk 21 turn clockwise about 135° and then stop.

Also, in a lower space of a frame body of the screw feeding mechanism 1 and the screw discharging unit 2, a control unit 6 of the automatic screw tightening apparatus is provided. The control unit 6 includes a control board which is represented by reference numeral '61' in FIG. 3 and has a control circuit formed thereon.

Here, a chute block 31 of the screw transferring mechanism 3 is fixed to the screw feeding mechanism 1 to be close to the screw discharging unit 2, and a tube connection portion 315 of the chute block 31 is connected to the transfer tube 32 connected to a screw tightening mechanism 5.

In the stop state of the screw bringing disk 21 shown in (b) of FIG. 7, the screw S is at the position of a movement inlet 311 of the transfer mechanism 3 with a screw head portion S1 tilted downward by the 180° rotation. Subsequently, as shown in (c) of FIG. 7, the screw S1 moves to a screw guide path 312 by the weight of the screw.

At this time, the screw S falls into the chute block 31, and the fallen screw S is sensed by a sensor. Then, the sensor inputs a signal to the control unit 6, and the control unit 6 controls the screw discharging unit 2 to stand by until a next-screw transfer command is received.

Next, compressed air is supplied to a compressed-air inlet 313 provided in the chute block 31 and is blown out from the a nozzle 314 positioned in the upstream of the screw S in the screw guide path 312 according to a command of the control command device (not shown), and at the same time, a suction of the screw tightening mechanism 5 is imposed on the transfer tube 32 according to a command of the control command device (not shown), whereby the screw S induced in the screw guide path 312 with the head portion S1 being in the lead is sucked from the feed head unit 331 attached to a discharging unit 33 of a fore end of the transfer tube 32 so as to be transferred to the screw tightening mechanism 5 side.

If the transfer of the screw S is completed, the screw discharging unit 2 should take out the next screw S. To this end, the screw bringing disk 21 turns counterclockwise as shown in (d) of FIG. 7 so as to return to the state as shown in (a) of FIG. 7, and stands by in a state in which the first screw from the aligned-screw guide 122 is fitted in the screw receiving groove 213 of the screw bringing disk 21.

As described above, the screw S moves in the transfer tube 32 with the screw head portion S1 being in the lead, and is fed to the screw tightening mechanism 5. Further, a predetermined length of transparent tube may be used as the transfer tube 32. The transparent tube is formed of synthetic resin, has flexibility, has a constant inner diameter, and has an inner wall to which a material to prevent screws from getting stuck in the transparent tube is applied. Needless to say, the inner diameter may vary according to used screws S.

Discharging Unit 33 and Driver Bit Portion 51

Here, the discharging unit 33 of the fore end of the transfer tube 32 and the feed head unit 331 that is a major component of the discharging unit 33 will be described with reference to FIGS. 8 to 11.

First, an overview of the relationship among the discharging unit 33, the screw assembling station 4, and the screw tightening mechanism 5 will be described with reference to FIG. 8.

In FIG. 8, the feed head unit 331 and the like of the discharging unit 33 are covered by a cover 34. Together with a junction portion of the transfer tube 32, the feed head unit 331 linearly moves in a horizontal direction (denoted by an arrow X in FIG. 8) so as to be placed under the driver bit unit 51 of the screw tightening mechanism 5. Then, the driver bit unit 51 is engaged with a screw S transferred from the transfer tube 32 by suction. The driver bit unit 51 engaged with the screw S horizontally moves in the left and right directions at a predetermined position by a left/right (X-direction) movement mechanism while the subject moving unit 42 of the screw assembling station 4 moves forward and backward, such that the screw S is accurately positioned over the screwed portion 422 of the subject 421. Then, the screw tightening mechanism (driver) 5 and the driver bit unit 51 descend, and rotate the screw S to tighten the screw against the screwed portion 422.

Here, a configuration of the discharging unit 33 will be described in detail with reference to FIGS. 9 to 13.

In FIG. 9, the discharging unit 33 is fixed to an appropriate portion of the screw assembling station 4 by a fixing member 43, and mainly includes a base portion 332 fixed to the fixing member 43, the feed head unit 331 provided at a fore end to be movable, and a cylinder member 333 which is a movement member to linearly moves the feed head unit 331 in the left and right directions.

The relationship among the feed head unit 331, the base portion 332, and the cylinder member 333 will be described with reference to the top view of FIG. 10. The cylinder member 333 is attached to the base portion 332, and the feed head unit 331 is attached to moving ends of a pair of withdrawable piston rods 3331. The cylinder member 333 is connected to a pair of pneumatic pipes 3332. Therefore, if a solenoid valve (not shown) is operated by a command from the control command device, the feed head unit 331 moves to a position shown by a dotted line in FIG. 10.

As shown in FIG. 11 which is a cross-sectional view at the feed head unit 331 of FIG. 10, the feed head unit 331 includes a guide block 3311 having a U-shaped guide hole 3312. An upper surface portion of the guide block 3311 has one end 33111 connected to the transfer tube 32 through a connection member 33122, and the other end 33112 where a screw delivery hole 3313 is formed to correspond to the driver bit unit 51. In the vicinity of the screw delivery hole 3313, a screw existence/non-existence detecting sensor 3314 is provided.

Guide Block

The axis direction of the passage of the screw delivery hole 3313 provided in the vicinity of the center of the upper portion of the feed head unit 331 is almost opposite to (forms almost 180° with) the axis direction of the passage of the transfer tube 32 connected to the feed head unit 331. For this reason, in the feed head unit 331, a structure for changing the passage to be curved should be prepared. However, in the case of merely bending a general pipe, a curved portion of the pipe is inevitably somewhat flattened and thus screws S often get stuck therein.

Therefore, as shown in FIG. 12, in this embodiment, the guide block 3311 is used for freely designing the shape of the passage. The guide block 3311 is splittable into two guide block components 3311a and 3311b (left and right), and the two guide block components 3311a and 3311b join together by inserting bolts 3317 to block joint holes 3316. One guide block components 3311a (or 3311b) of the guide block 3311 has a shape as shown in (b) and (c) of FIG. 12. In matching surfaces 33121 of the guide block components 3311a and 3311b facing each other when the guide block components 3311a and 3311b join together, curved guide grooves 33122 are formed to be a screw guide passage connecting the screw delivery hole 3313 and the U-shaped guide hole 3312 when the guide block components 3311a and 3311b join together.

In this case, the curved guide grooves 33122 to be the screw guide passage may be freely cut into the matching surfaces 33121 of the guide block components 3311a and 3311b such that the cross-section of the screw guide passage has an uniform true circle shape over the screw guide passage or has a slightly larger true circle shape only in the curved portion if necessary. Therefore, the curved portion of the screw guide passage is not flattened.

Further, the curved passage portion of the feed head unit 331 is formed by the splittable guide block components 3311a and 3311b, and the curved guide grooves 33122 are formed in the matching surfaces 33121 of the two guide block components 3311a and 3311b for smoothly guiding screws.

Furthermore, the screw delivery hole 3313 of the feed head unit 331 is connected to a longitudinal groove 3318 through which only a thread portion of a screw can pass. As shown in (b) and (c) of FIG. 12, the longitudinal groove 3318 is formed in perpendicular to the matching surfaces of the guide block components to have an opening 3318a such that the screw S and the driver bit (BIT) 511 can be released from the feed head unit 331 to the outside. Therefore, the screw S engaged with the driver bit portion 51 can horizontally move in the longitudinal groove 3318 to the external of the guide block 3311 and the feed head unit 331.

That is, the inner diameter (denoted by a reference symbol 'X1' in FIG. 12) of the guide hole 3312 (screw feed hole) of the feed head unit 331 of the discharging unit 33 is slightly lager than a head portion S1 of a screw. However, the width (denoted by a reference symbol 'X2' in FIG. 2) of the longitudinal groove 3318 through which only a thread portion S2 of a screw can pass is narrower than a head portion S1 of a screw and is slightly wider than a thread portion S1 of a screw.

Feed Head Unit

An operation of the feed head unit will be further described in detail with reference to FIG. 13.

In (a) of FIG. 13, if the control unit 6 issues a screw tightening command, the screw delivery hole 3313 of the feed head unit 331 advances by the cylinder member 333 to be positioned directly below the driver bit portion 51, and the fore end of the driver bit (BIT) 511 is operated to be accurately positioned directly above the screw delivery hole 3313

The cylinder member 333 is provided with a pair of sensors (not shown) for advance and retreat. If it is sensed by the sensors that the feed head unit 331 has advanced, a screw S is transferred from the screw transferring mechanism 3 to the guide hole 3312 of the guide block 3311 through the transfer tube 32 with the head portion S1 of the screw being in the lead, and is guided to the screw delivery hole 3313 which is an outlet of the guide hole 3312. Then, the head portion 51 of the screw is engaged with the fore end of the driver bit (BIT) 511 by suction of a screw holder (protective tube) 512 of the driver bit portion 51.

(b) of FIG. 13 is a cross-sectional view taken along line b-b of (a) of FIG. 13. If it is sensed by the screw existence/non-existence detecting sensor 3314 that the head portion S2 of the screw is in engagement with the fore end of the driver bit (BIT) 511, the piston rods 3331 retreat into the cylinder member 333 such that the screw delivery hole 3313 also retreats.

In (c) of FIG. 13, if the screw deliver hole 3313 retreats, the driver bit (BIT) 511 and the screw S do not move, but are positioned outside the opening 3318a by relatively moving the longitudinal groove 3318 corresponding to the thread portion S2.

Referring to (c) and (d) of FIG. 13, in the screw assembling station 4, the screw-tightening-mechanism moving unit 41 and the subject moving unit 42 move on basis of a program set according to predetermined position information such that the screwed portion 422 and the driver bit (BIT) 511 of the screw tightening mechanism (driver) 5 lie on the same line. Then, the screw tightening mechanism (driver) 5 descends and rotates the driver bit (BIT) 511 so as to tighten the screw S against the screwed portion 422.

If the screw S is completely tightened, as shown in (e) of FIG. 13, the screw tightening mechanism (driver) 5 returns to a normal standby position and the series of operations finish.

Meanwhile, as shown in (a) and (b) of FIG. 13, the driver bit (BIT) portion 51 of the fore end of the screw tightening mechanism (driver) 5 has a structure according to the related art of Japanese Patent Application Laid-Open No. Hei8-229752 or a well-known structure. The driver bit portion 51 sucks air from the gap between the driver bit (BIT) 511 and the screw holder 512 such that the driver bit 511 is engaged with a screw and holds the screw.

For the air suction, as shown in FIG. 1, an upper end portion of a main body portion 52 of the screw tightening mechanism 5 is connected to a suction pipe 53 which is connected to a suction apparatus (not shown) controllable by this system.

Further, the screw tightening mechanism (driver) 5 and a driver base portion 54 of the screw tightening mechanism 5 are configured to be vertically movable at a predetermined horizontal position by a vertical movement mechanism 55 which is controlled by the control unit 6. Furthermore, an ascent-position detecting sensor and a descent-position detecting sensor are sensors for upper and lower limits for restricting the movement range of the driver base portion 54.

Furthermore, the screw tightening mechanism (driver) 5 and the driver base portion 54 of the screw tightening mechanism 5 are configured to be movable left and right by a screw-tightening-mechanism moving unit 41 of the screw assembling station 4, and is controlled to stop at a predetermined position by a predetermined number of pulses.

Overview of Operation

An operation in the present embodiment described above will be described with reference to a flow chart of FIG. 14 and perspective views of FIGS. 15 to 19 illustrating individual states.

First, FIG. 15 is a view illustrating a standby state of the automatic screw tightening apparatus in which the feed head unit 331 is in a retreat state and the screw tightening mechanism (driver) 5 stands by an intermediate position between the feed head unit 331 and the subject moving unit 42.

In the standby state, when a screw feeding command is received from an upper-level device of the assembling robot, or if a manipulation button 62 is manually pushed to transmit a screw feeding command, in step S1 of FIG. 14, an automatic screw feeding operation starts. In step S2, the cylinder member 333 operates, and thus the piston rods 3331 advance to straight move the feed head unit 331 in a horizontal direction (an X direction) such that the driver bit (BIT) 511 is accurately positioned directly over the screw delivery hole 3313, as shown in FIG. 16.

Next, in step S3, existence or nonexistence of a fallen screw is detected by a screw-discharge detecting sensor 16 attached to the chute block 31. If a screw S to be fed is ready (Yes in step S3), the process proceeds to step S4. In contrast, if any ready screw S is not detected in step S3, the screw bringing disk 21 rotates 180° to guide a screw S from the movement inlet 311 to the screw guide path 312, and falls such that the screw is fallen into the chute block 31.

If there is a screw S in step S3, first, suction by the screw tightening mechanism (driver) 5 starts to be ready to receive the screw S.

Then, in step S4, a screw pressure-transfer operation starts, compressed air is injected from the compressed-air inlet 313 so as to move the screw S to the screw delivery hole 3313 which is an outlet of the feed head unit 331 of the discharging unit 33 with the head portion S1 being positioned in the lead in a moment.

Next, in step S6, it is detected by the screw existence/non-existence detecting sensor 3314 whether the screw S in the screw delivery hole 3313 is in engagement with driver bit (BIT) 511 as shown in FIG. 17. If the screw S is in engagement with the driver bit (BIT) 511 (Yes in step S6), the process proceeds to the next step S7, in which the pressure transfer by the screw transferring mechanism 3 stops. If the screw S is not in engagement with the driver bit (BIT) 511 (No in step S6), the process returns to step S5 so as to further continue the pressure transfer of the screw S.

Next, in step S8, as shown in FIG. 18, the cylinder member 333 operates, and thus the piston rods 3331 and the feed head unit 331 retreat such that the feed head unit 331 is settled in the standby position and the driver bit (BIT) 511 engaged with the screw S is exposed to the outside of the feed head unit 331.

If it is detected in step S9 by a sensor (not shown) that the feed head unit 331 is located in the standby position, in step S10, the screw transferring operation finishes and the driver bit portion 51 is completely ready.

Then, the process proceeds to step S21 in which a screw tightening operation process begins to move the screw tightening mechanism (driver) 5 to a predetermined position by the screw-tightening-mechanism moving unit 41.

The screw tightening operation follows the step S9. In step S21, the screw tightening mechanism 5 moves left and right (in the X direction) (right in this embodiment) by the screw-tightening-mechanism moving unit 41 of the screw assembling station 4 and stops at a predetermined position set by the control command device. In step S22, a screwed subject 421 of various devices such as cameras or portable phones fixed to a subject moving unit 42 of the screw assembling station 4 moves back and forth (in the Y direction) by the subject moving unit 42 such that a screwed portion 422 and the driver bit 511 lie on the vertical same line. The step S22 may be performed simultaneously with the step S21.

In step S23, it is checked whether the screwed portion 422 and the driver bit 511 lie on the vertical same line. If the screwed portion 422 and the driver bit 511 do not lie on the same vertical line (No in the step S23), the process proceeds to the step S22. If the screwed portion 422 and the driver bit 511 lie on the same vertical line (Yes in the step S23), in step S24, the vertical movement mechanism 55 is activated by the screw tightening mechanism 5, so as to set the driver bit 511 engaged with the screw at a set position. Next, in step S25, the driver bit (BIT) 511 rotates to start a screw tightening operation.

In step S25, the driver bit (BIT) 511 rotates to start the screw tightening operation. This operation state is shown in the perspective view of FIG. 19.

Next, in step S26, it is sensed whether the rotation of the driver bit 511 stops. If the rotation of the driver bit 511 stops, in step S27, the screw tightening operation finishes, and at the same time, the suction by the driver bit 511 stops. In contrast, if the rotation of the driver bit 511 continues, the process returns to the step S25.

After the step S27, in step S28, the screw tightening mechanism 5 moves left or right (left in this embodiment) by the screw-tightening-mechanism moving unit 41 of the screw assembling station 4, and the subject 421 moves to a predetermined position set by the control command device. Then, in step S29, the screw tightening operation finishes.

Subsequently, steps S1 to S29 of the above-mentioned automatic screw tightening operation may be repeated to assembly predetermined portions of subjects.

Here, the screw transfer mechanism using air according to the embodiment of the present invention will be described in detail by contrasting disadvantages of pressure transfer by compressed air according to the related art shown in FIGS. 20 and 21 with effects of suction by a suction device according to the embodiment of the present invention.

As can be seen from an air flow shown by arrows in (c) of FIG. 20, air for pressure transfer causes vortex between a Y-shaped path h and a holder c1 of a fore-end portion. As a result, the number of times screws get stuck or are reversed increases. Specifically, all the air supplied for pressure transfer is not discharged from an outlet of a route but the flow of remaining air is reversed between the Y-shaped path h and the holder c1 so as to cause a vortex state. Therefore, a rotation force is applied to screws. For this reason, short screws and light screws may be easily inverted.

Further, as shown in (a) of FIG. 21, as one of method for preventing a screw from being reversed, there has been proposed a configuration in which a screw-reversal preventing mechanism i for preventing a screw from being reversed in the vicinity of a Y-shaped path h is attached. However, as shown in (b) of FIG. 21, in a screw feed driver unit having the above-mentioned configuration, in a case of a screw whose length is more than about twice or the diameter of the screw head and in a case of a large-sized screw (heavy screw), if each screw transfer tube has an appropriate inner diameter, stable feed is possible. However, in a case of a screw whose length is less than about twice the diameter of the screw head or in a case of a small-sized screw (light screw), the probability in which the screw gets stuck or is reversed between the Y-shaped path h and a holder c1 remarkably increases.

Therefore, the embodiment of the present invention solves the vortex phenomenon of air occurring between the Y-shaped path h and the holder c1 by changing the screw transfer manner from pressure transfer to suction.

First of all, in the case of pressure transfer, as a method of suppressing a vertex, a method of adjusting an amount of air in order not to cause a vertex can be exemplified. However, actually, since there are too many factors for adjustment, such as a variation in the sizes or shapes of individual screws or a variation in the temperature or dew point of supplied air, it is very difficult to appropriately adjust the amount of air.

Meanwhile, in a case where a screw is transferred by suction as in the embodiment of the present invention, an amount of air flowing into the driver is determined by an amount of discharged air of the suction device for suction, which means that no air remains. Therefore, a vertex state of air does not occur. As a result, it becomes possible to transfer a screw in a stable posture.

Since the automatic screw tightening apparatus according to the embodiment of the present invention has the configuration and the action as described above, it has the following advantages.

(1) Since the screw transfer mechanism 3 by compressed air from the screw feeding mechanism side transfers a screw S with a screw head portion S1 being in the lead, the screw is less likely to damage the inner wall of the transfer tube 32 and does not get stuck in the transfer tube 32, and it is possible to stabilize the posture of the screw S, firmly engage the screw S with the driver bit, and stably feed the screw, thereby capable of improving the reliability.

(2) Further, since the feed head unit is provided with the longitudinal groove where a screw is capable of horizontally parallel movement, the feed head unit may move only horizontally, the motion and structure of the feed head unit 331 can be simplified, a screw engaged with the driver bit 511 can be automatically and quickly tightened against the screwed portion 422 of the subject, and the feed head unit 331 can be made compact. In particular, in the operation to engage a head portion S1 of a screw with the driver bit 511 at the feed head unit 331, the driver bit 511 may simply linearly move in the horizontal direction (left and right) without moving vertically (in the Z-axis direction). Therefore, it is possible to very quickly engage the screw S with the driver bit 511 and a very small number of components are used.

As described above, it is possible to automatically and quickly tightening a screw engaged with the driver bit against the screwed portion of the subject. Further, the structure for engagement of a screw with the driver bit is also simple, maintenance is easy, and the manufacture cost is low.

(3) Since the feed head unit 331 has the curved guide grooves formed in the matching surfaces of splittable guide block components to guide a screw, the curved portion of the screw guide passage is not flattened, unlike the related art. Further, a design can be freely made such that the cross-section of the screw guide passage has a uniform true circle shape over the screw guide passage or has a slightly larger true circle shape only in the curved portion if necessary.

Further, it is apparent that the present invention is not limited to the above-mentioned embodiment as long as the features of the present invention are damaged. For example, although one feed head unit 331 is provided in the embodiment, it is apparent that two or more feed head units may be provided to correspond to the driver bit unit 51. Also, although the feed head unit 331 linearly moves in the left and right directions (the X direction) by the cylinder member 333, the feed head unit 331 may move back and forth (in the Y direction). The main point is that the screw tightening mechanism (driver) 5 may not be required to move upward and downward (in the Z direction) when it is engaged with a screw.

It will be apparent to those skilled in the art that various modifications and changes may be made without departing from the scope and spirit of the invention. Therefore, it should be understood that the above embodiment is not limitative, but illustrative in all aspects. The scope of the invention is defined by the appended claims rather than by the description preceding them, and therefore all changes and modifications that fall within metes and bounds of the claims, or equivalents of such metes and bounds are therefore intended to be embraced by the claims.

What is claimed is:

1. An automatic screw tightening apparatus configured and arranged to transfer a screw from a screw feeding mechanism generating compressed air to a screw tightening mechanism with a screw transferring mechanism using the compressed air of the screw feeding mechanism, engage the screw with a driver bit portion of a downstream end of the screw tightening mechanism, and tighten the screw against a predetermined screwed portion, comprising:

a discharging unit configured and arranged to transfer the screw in a transfer tube of the screw feeding mechanism with a head portion of the screw being arranged to face downstream, a feed head unit configured and arranged at a downstream end of the discharging unit and having a screw feed hole having a diameter slightly larger than the head portion of the screw, and a movable arm configured and arranged to be horizontally movable, the feed head unit being configured and arranged to be movable between a close-contact position where the feed head unit is in close contact with the driver bit portion of the downstream end of the screw tightening mechanism and an evacuation position where the feed head unit is spaced apart from the driver bit unit, at the close-contact position, the driver bit portion of the downstream end of the screw tightening mechanism is configured and arranged to contact the screw and suction the head portion of the screw, and the feed head unit includes a guide block arranged to orient the screw for reception by the driver bit portion and having a channel shaped and arranged for receiving the screw from the transfer tube and orienting the screw head for reception by the driver bit portion, the channel including the screw feed hole and a longitudinal groove located at a predetermined position and opened to the outside of the guide block, the channel being oriented to flip a screw traveling therethrough, such that orientation of the screw entering the guide block channel is opposite orientation of the screw exiting the screw feed hole, the longitudinal groove configured to have a width narrower than the head portion of the screw and larger than a threaded stem of the screw, such that the screw engaged with the driver bit portion horizontally moves toward the outside, the longitudinal groove being connected to the screw feed hole vertically extending, and only the threaded stem of the screw is capable of horizontally advancing and retreating in the longitudinal groove.

2. The automatic screw tightening apparatus according to claim 1, additionally comprising:

a curved passage in the feed head unit formed by curved guide grooves and configured and arranged for guiding the screw in matching surfaces of opposed guide block components forming a split guide block.

3. The automatic screw tightening apparatus according to claim 1, wherein the guide block channel is oriented such that an axial direction of the screw feed hole forms an approximately 180° angle with an axial direction of the transfer tube.

4. The automatic screw tightening apparatus according to claim 1, wherein the longitudinal groove, together with the screw feed hole, form a substantially keyhole-shaped channel.

5. The automatic screw tightening apparatus according to claim 1, wherein the screw feed hole is substantially cylindrical and the longitudinal groove substantially rectangular parallelepiped.

6. The automatic screw tightening apparatus according to claim 2, wherein the opposed guide block components comprise joint holes and bolts for insertion into the joint holes to secure the block components together.

7. An automatic screw tightening apparatus configured and arranged to transfer a screw from a screw feeding mechanism generating compressed air to a screw tightening mechanism with a screw transferring mechanism using the compressed air of the screw feeding mechanism, engage the screw with a driver bit portion of a downstream end of the screw tightening mechanism, and tighten the screw against a predetermined screwed portion, comprising:
- a discharging unit configured and arranged to transfer the screw in a transfer tube of the screw feeding mechanism with a head portion of the screw being arranged to face downstream,
- a feed head unit configured and arranged at a downstream end of the discharging unit and having a screw feed hole having a diameter slightly larger than the head portion of the screw, and a movable arm configured and arranged to be horizontally movable,
- the feed head unit being configured and arranged to be movable between a close-contact position where the feed head unit is in close contact with the driver bit portion of the downstream end of the screw tightening mechanism and an evacuation position where the feed head unit is spaced apart from the driver bit unit,
- at the close-contact position, the driver bit portion of the downstream end of the screw tightening mechanism is configured and arranged to contact the screw and suction the head portion of the screw, and
- the feed head unit includes a guide block arranged to orient the screw for reception by the driver bit portion and having a U-shaped channel shaped and arranged for receiving the screw from the transfer tube and orienting the screw head for reception by the driver bit portion, the channel including the screw feed hole and a longitudinal groove located at a predetermined position and opened to the outside of the guide block, the longitudinal groove configured to have a width narrower than the head portion of the screw and larger than a threaded stem of the screw, such that the screw engaged with the driver bit portion horizontally moves toward the outside, the longitudinal groove being connected to the screw feed hole vertically extending, and only the threaded stem of the screw is capable of horizontally advancing and retreating in the longitudinal groove.

8. The automatic screw tightening apparatus according to claim 7, wherein the guide block channel is oriented such that an axial direction of the screw feed hole forms an approximately 180° angle with an axial direction of the transfer tube.

9. The automatic screw tightening apparatus according to claim 7, wherein the guide block channel comprises a circular cross-section at least over a portion thereof.

10. The automatic screw tightening apparatus according to claim 9, wherein the guide block channel comprises a slightly larger true circle shape over a curved portion thereof.

* * * * *